United States Patent
Ciminello

(10) Patent No.: US 12,481,970 B2
(45) Date of Patent: Nov. 25, 2025

(54) ERROR DETECTION FOR WIRE-TRANSFER REQUESTS IN WIRE-TRANSFER APPLICATIONS IN A COMPUTING ENVIRONMENT

(71) Applicant: Truist Bank, Charlotte, NC (US)

(72) Inventor: Noel Ciminello, North Dartmouth, MA (US)

(73) Assignee: Truist Bank, Charlotte, NC (US)

( * ) Notice: Subject to any disclaimer, the term of this patent is extended or adjusted under 35 U.S.C. 154(b) by 216 days.

(21) Appl. No.: 18/330,892

(22) Filed: Jun. 7, 2023

(65) Prior Publication Data
US 2024/0412178 A1    Dec. 12, 2024

(51) Int. Cl.
*G06Q 20/10* (2012.01)
*G06Q 20/02* (2012.01)

(52) U.S. Cl.
CPC ........... *G06Q 20/10* (2013.01); *G06Q 20/023* (2013.01)

(58) Field of Classification Search
CPC .............................. G06Q 20/10; G06Q 20/023
USPC .......................................................... 705/39
See application file for complete search history.

(56) References Cited

U.S. PATENT DOCUMENTS

| | | | |
|---|---|---|---|
| 2002/0016769 A1* | 2/2002 | Barbara | G06Q 40/02 705/40 |
| 2017/0221066 A1* | 8/2017 | Ledford | G06Q 20/4016 |

* cited by examiner

*Primary Examiner* — Bennett M Sigmond
*Assistant Examiner* — Michael J Warden
(74) *Attorney, Agent, or Firm* — Kilpatrick Townsend & Stockton LLP; Michael A. Springs. , Esq.

(57) ABSTRACT

Wire-transfer requests processed in wire-transfer environments can be monitored. For example, a computing device can monitor communication channels between a wire-transfer application that can perform wire transfers and other applications. The other applications can include a wire-initiating application that can transfer wire-transfer requests to the wire-transfer application and a wire-reporting application that can generate reporting data for the wire-transfer requests. The computing device can detect an error with respect to the wire-transfer requests or the reporting data transmitted via the communication channels. In response to detecting the error, the computing device can generate an error notification comprising a description of the error to output for use in resolving the error.

20 Claims, 4 Drawing Sheets

400

402
Monitor a plurality of communication channels between a plurality of applications and a wire-transfer application configured to perform wire transfers, the plurality of applications comprising a wire-initiating application configured to transfer a plurality of wire-transfer requests to the wire-transfer application and a wire-reporting application configured to generate reporting data for the plurality of wire-transfer requests

404
Detect an error with respect to the plurality of wire-transfer requests or the reporting data transmitted via the plurality of communication channels

406
In response to detecting the error, generate an error notification comprising a description of the error to output for use in resolving the error

ERROR DETECTION FOR WIRE-TRANSFER REQUESTS IN WIRE-TRANSFER APPLICATIONS IN A COMPUTING ENVIRONMENT

TECHNICAL FIELD

The present disclosure relates generally to computing environments and, more particularly (although not necessarily exclusively), to error detection for wire-transfer requests in wire-transfer applications in a computing environment.

BACKGROUND

Computer environments can perform interactions such as wire transfers between two or more computer systems. In the context of a wire transfer, the interaction between the computer systems may be facilitated by a wire-initiating application, which can transfer a wire-transfer request to be processed by a wire-transfer application. The wire-transfer application can use one or more wire payment systems, such as Fedwire, Clearing House Interbank Payments System (CHIPS), and Society for Worldwide Interbank Financial Telecommunications (SWIFT) to process the wire-transfer request and perform a wire transfer.

DETAILED DESCRIPTION

Figure 1:
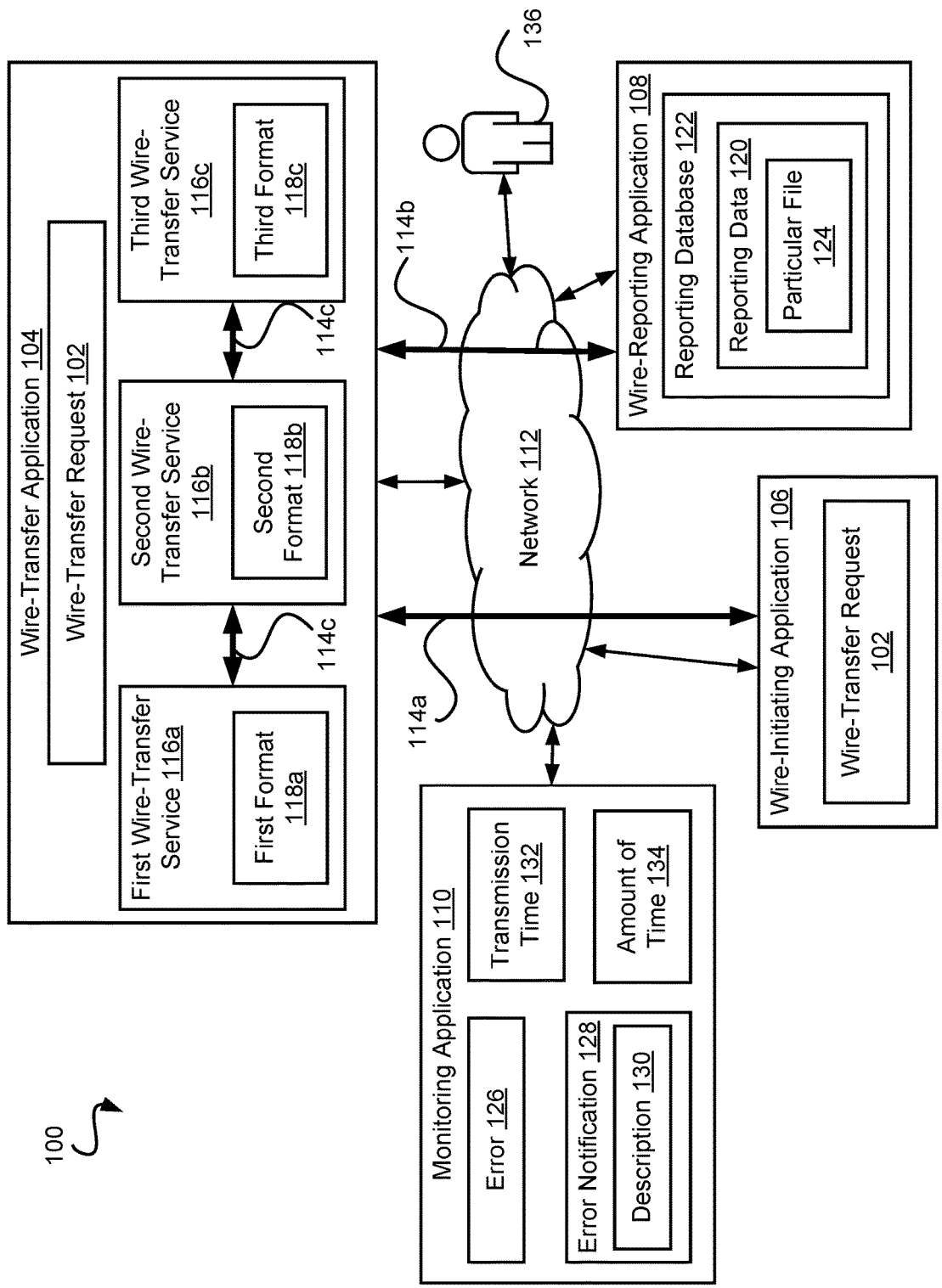
FIG. 1 is a block diagram of an example of a computing environment for monitoring wire-transfer requests processed by a wire-transfer application, according to some aspects of the present disclosure.

A wire-transfer application, such as the Money Transfer System (MTS) application, can process wire transfer requests to perform wire transfers between computer systems. The MTS application can operate in a highly complex wire transfer environment that involves several servers, services, databases, and more. To perform wire transfers, wire-transfer requests can be transmitted between multiple components of the wire-transfer environment. The complicated pathways for wire-transfer requests can involve several potential failure points at which a wire-transfer request may be dropped, stalled, become corrupted, or be otherwise prevented from being processed. Many wire-transfer requests are processed in real time, which can be hindered by errors that may not be immediately detected. In some instances, a trapped wire-transfer request may remain pending indefinitely, consuming valuable computing resources. Errors, trapped requests, application failures, and other problems associated with the wire-transfer application can waste significant computing resources (e.g., memory usage and processing power), especially when they remain unresolved for long periods of time. These problems can also cascade, causing downstream operations of the wire-transfer application to also experience issues. For example, the wire-transfer application may not process subsequent wire-transfer requests as efficiently or may fail altogether.

Some examples of the present disclosure overcome one or more of the abovementioned problems by using a monitoring service to monitor and detect the wire-transfer application and related applications. In particular, the monitoring service can monitor communication channels between the wire-transfer application and other applications. In some examples, the monitoring service can monitor communication channels between services in the wire-transfer application. When an error is detected, the monitoring service can automatically determine an associated user and can transmit an error notification to the associated user. The error notification can include a description of the error. In some examples, the monitoring service may perform error handling to automatically resolve the error. By monitoring communication channels, the monitoring service can identify errors that may otherwise remain undetected for long periods of time. This can allow errors to be quickly resolved, enabling wire-transfer requests to be performed in real time. Additionally, quickly resolving errors can also result in improved performance of the wire-transfer application and reduction of wasteful consumption of bandwidth and computing resources, while also maintaining the security integrity of the computer system.

In one particular example, a user can request a wire transfer be performed via a wire-initiating application such as Wire Payment Initiation (WPI). WPI can transmit a wire-transfer request for the wire transfer to a wire-payment application, such as Money Transfer Service (MTS). MTS can coordinate and perform processing of the wire-transfer request. WPI can transfer the wire-transfer request to MTS via a communication channel. A monitoring service can monitor the communication channel to ensure that wire-transfer requests are successfully transmitted. For example, the monitoring service can monitor a time difference between a current time and a transmission time for the wire-transfer request. If the time difference exceeds a predefined threshold before MTS receives the wire-transfer request, the monitoring service can determine an error for the wire-transfer request. An error notification can be generated for the user that submitted the wire-transfer request. Additionally, the error notification can be transmitted to a developer associated with the communication channel.

In some examples, the monitoring service may additionally perform a mitigation operation to attempt to resolve the error. For example, if most or all wire-transfer requests transmitted via the communication channel are not being received by MTS, the monitoring service may cause the communication channel to be shut off. Then, the monitoring service can re-establish connection between WPI and MTS. If the monitoring service continues to detect the same error, the monitoring service can send another error notification that includes description and results of the mitigation operation to an associated user (such as a software developer responsible for the communication channel).

These illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing environment 100 for monitoring wire-transfer requests 102 processed by a wire-transfer application 104, according to some aspects of the present disclosure. The computing environment 100 can include the wire-transfer application 104, a wire-initiating application 106, a wire-reporting application 108, and a monitoring application 110 that can communicate via a network 112. The network 112 can be a public data network, a private data network, or some combination thereof. A data network may include one or more of a variety of different types of networks, including a wireless network, a wired network, or a combination of a wired and a wireless network. Examples of suitable networks include the Internet, a personal area network, a local area network (LAN), a wide area network (WAN), or a wireless local area network (WLAN).

The wire-transfer application 104 can process wire-transfer requests 102 to perform wire transfers between computing systems (e.g., transfers of money between one or more entity's accounts hosted on the computing systems). For example, the wire-transfer application 104 can transmit or receive wire-transfer requests 102 from the wire-initiating application 106. An example of the wire-transfer application 104 is the Money Transfer System (MTS) application, and an example of the wire-initiating application 106 is the Wireless Payment Initiation (WPI) application. The wire-transfer requests 102 can be transmitted to or received from the wire-transfer application 104 via first communication channels 114a, also referred to as "lines." The communication channels 114a can be socket connections or message queue (MQ) connections between the wire-transfer application 104 and the wire-initiating application 106.

The wire-transfer application 104 can process the wire-transfer requests 102 to perform wire transfers using wire-transfer services 116a-c. The services can be interfaces or other types of applications for wire-transfer payment and communication systems, such as Fedwire, Clearing House Interbank Payments System (CHIPS), and Society for Worldwide Interbank Financial Telecommunication (SWIFT). In some examples, the wire-transfer application 104 may interface with one or more of the wire-transfer services 116a-c to process a wire-transfer request 102 to perform a wire transfer. For example, Fedwire can handle domestic electronic fund transfers in the United States. CHIPS can handle international electronic fund transfers with participating international institutions. And, SWIFT can provide secure international wire-transfer messaging.

Each of the wire-transfer services 116a-c may be associated with their own format 118a-c for processing wire-transfer requests 102. When multiple wire-transfer services 116a-c are used to process a wire-transfer request 102, the wire-transfer request 102 may be converted from one format to another. For example, the wire-transfer request 102 may involve a first domestic wire transfer and a second international wire transfer. Thus, the wire-transfer request 102 can be processed by the first wire-transfer service 116a (e.g., Fedwire) and then by the second wire-transfer service (e.g., CHIPS). The first wire-transfer service 116a can convert the wire-transfer request 102 to the second format 118b before transmitting the converted wire-transfer request 102 to the second wire-transfer service 116b. To complete processing of the wire-transfer request 102 and perform the wire request, the wire-transfer application 104 can use one of the wire-transfer services 116a-c to submit the processed wire-transfer request 102 to one of the wire-transfer payment systems (e.g., Fedwire or CHIPS).

After the wire-transfer requests 102 have been processed, the wire-reporting application 108 can generate reporting data 120 associated with the processing of the wire-transfer requests 102. The reporting data 120 can be transmitted to and stored in a reporting database 122 that tracks up-to-date, real time data for wire transfers. The wire-reporting application 108 can communicate with the wire-transfer application 104 to generate the reporting data 120 via second communication channels 114b.

In some examples, errors 126 may occur in the computing environment 100. For example, wire-transfer requests 102 from the wire-initiating application 106 to the wire-transfer application 104 may not be transmitted successfully. The wire-reporting application 108 may generate invalid reporting data 120 for wire transfers. Or, processing of wire-transfer requests 102 between the wire-transfer services 116a-c can experience issues. As there are many points of transmission in the computing environment 100, there can be many failure points at which transmission of a wire-transfer request 102 or any other type of data transmission experiences a failure. Thus, the monitoring application 110 can monitor communication channels 114a-c to detect errors 126.

In an example, the monitoring application 110 can monitor the first communication channel 114a between the wire-initiating application 106 and the wire-transfer application 104. The first communication channel 114a may not always be active (e.g., providing a connection between the wire-initiating application 106 and the wire-transfer application 104 through which requests can be transmitted). When connection is established via the first communication channel 114a, the monitoring application 110 can begin monitoring wire-transfer requests 102 that are transmitted via the first communication channel 114a. The monitoring application 110 can record a transmission time 132 for each wire-transfer request 102 transmitted from the wire-initiating application 106 to the wire-transfer application 104. If wire-transfer requests 102 are not received by the wire-transfer application 104 within a predefined amount of time 134 since the transmission time 132, the monitoring application 110 can detect an error 126. The error 126 may be due to transmission issues with the first communication channel 114a, issues with the network 112, or issues with the wire-transfer application 104. Because the wire-transfer application 104 has not received the wire-transfer request 102 within the predefined amount of time 134, the wire-transfer request 102 may be unable or unlikely to be processed in real time.

In another example, the monitoring application 110 can monitor the second communication channel 114b between the wire-transfer application 104 and the wire-reporting application 108. The wire-reporting application 108 can use the second communication channel 114b to receive information on wire-transfer requests 102 for generating reporting data 120. In some examples, the second communication channel 114b can be between the wire-reporting application 108 and the reporting database 122. The monitoring application 110 can monitor the second communication channel 114b to detect errors 126. For example, the monitoring application 110 can scan files in the reporting data 120 to identify a particular file 124 that is corrupted. The monitoring application 110 may also detect an error 126 if the wire-reporting application 108 is unable to process the particular file 124 or store the particular file 124 in the reporting database 122.

In some examples, the monitoring application 110 can monitor the wire-transfer services 116a-c used the wire-transfer application 104. For example, the monitoring application 110 can monitor transmission of wire-transfer requests between wire-transfer services 116a-c via third communication channels 114c. Errors 126 in transmission may occur when the wire-transfer request 102 is converted from one format to another, such as from the first format 118a to the third format 118c. The monitoring application 110 can monitor transmission times 132 for converted wire-transfer requests 102 transmitted via the third communication channels 114c. If the transmission time 132 for a converted wire-transfer request 102 exceeds a predefined amount of time 134, the monitoring application 110 can detect an error 126. Additionally, if one of the wire-transfer services 116a-c is unable to process the converted wire-transfer request 102, the monitoring application 110 can detect an error 126. In some examples, the monitoring application 110 may use a neural network such as a trained machine learning model to detect errors 126.

After detecting the error 126, the monitoring application 110 can generate an error notification 128 that includes a description 130 of the error 126. The error notification 128 may be an email notification that can be transmitted to one or more users 136 associated with the error 126. The user 136 may be the user that submitted the wire-transfer request 102 to the wire-initiating application 106. The user 136 may also be a software developer associated with the component of the computing environment 100 that is experiencing the error 126. The description 130 may include details relating to the error 126, such as the type of wire-transfer request 102 that is involved, which communication channel 114 was transmitting the wire-transfer request 102, transmission time 132 of the wire-transfer request 102, processing history of the wire-transfer request 102, and any other metadata associated with the error 126. In some examples, the description 130 can additionally include a suggested mitigation operation for addressing or resolving the error 126. For example, the monitoring application 110 can input the description 130 of the error 126 into a trained machine learning model and can use an output of the trained machine learning model to determine a mitigation operation. In some examples, the monitoring application 110 may automatically perform the mitigation operation in response to detecting the error 126.

Figure 2:
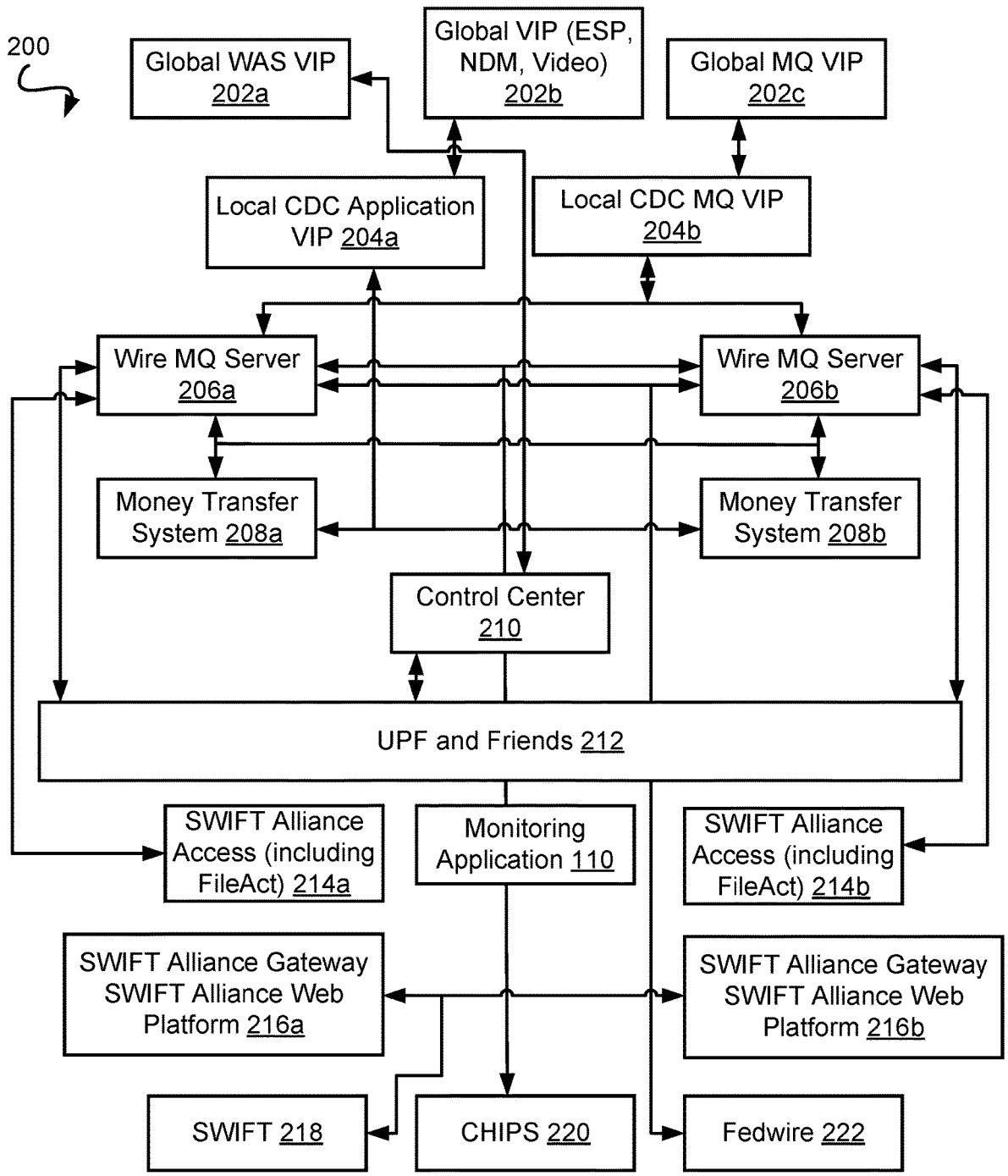
FIG. 2 is a block diagram of another example of a computing environment for monitoring wire-transfer requests processed by a wire-transfer application, according to some aspects of the present disclosure.

FIG. 2 is a block diagram of another example of a computing environment 200 for monitoring wire-transfer requests processed by a wire-transfer application, according to some aspects of the present disclosure. The computing environment 200 can include wire-initiating applications such as Global WAS VIP 202a, Global VIP 202b (which includes ESP, NDM, and Video), and Global MQ VIP 202c. The wire-initiating applications can transmit wire-transfer requests to local servers including Local CDC Application VIP 204a and Local CDC MQ VIP 204b. The local servers can send the wire-transfer requests to Wire MQ Server 206a and Wire MQ Server 206b, which can communicate with Money Transfer System 208a and Money Transfer System 208b. The computing environment 200 can also include control center 210 and UPF and Friends 212 that are connected to the Wire MQ Servers 206a-b and the Money Transfer Systems 208a-b. The computing environment 200 also includes wire-transfer services for SWIFT, ausch as the SWIFT Alliance Access (including FileAct) 214a-b and the SWIFT Alliance Gateway/Swift Alliance Web Platform 216a-b that are connected to the Wire MQ Servers 206a-b. The Money Transfer Systems 208a-b and control center 210 can coordinate processing of the wire-transfer requests by causing wire-transfer requests to be transmitted between the components depicted in the computing environment 200. After processing, wire transfers can be performed by submitting the processed wire-transfer requests to a wire transfer system, such as SWIFT 218, CHIPS 220, or Fedwire 222. The monitoring application 110 can monitor all of the communication channels between the components in the computing environment 200 to detect errors associated with transmitting wire-transfer requests.

Figure 3:
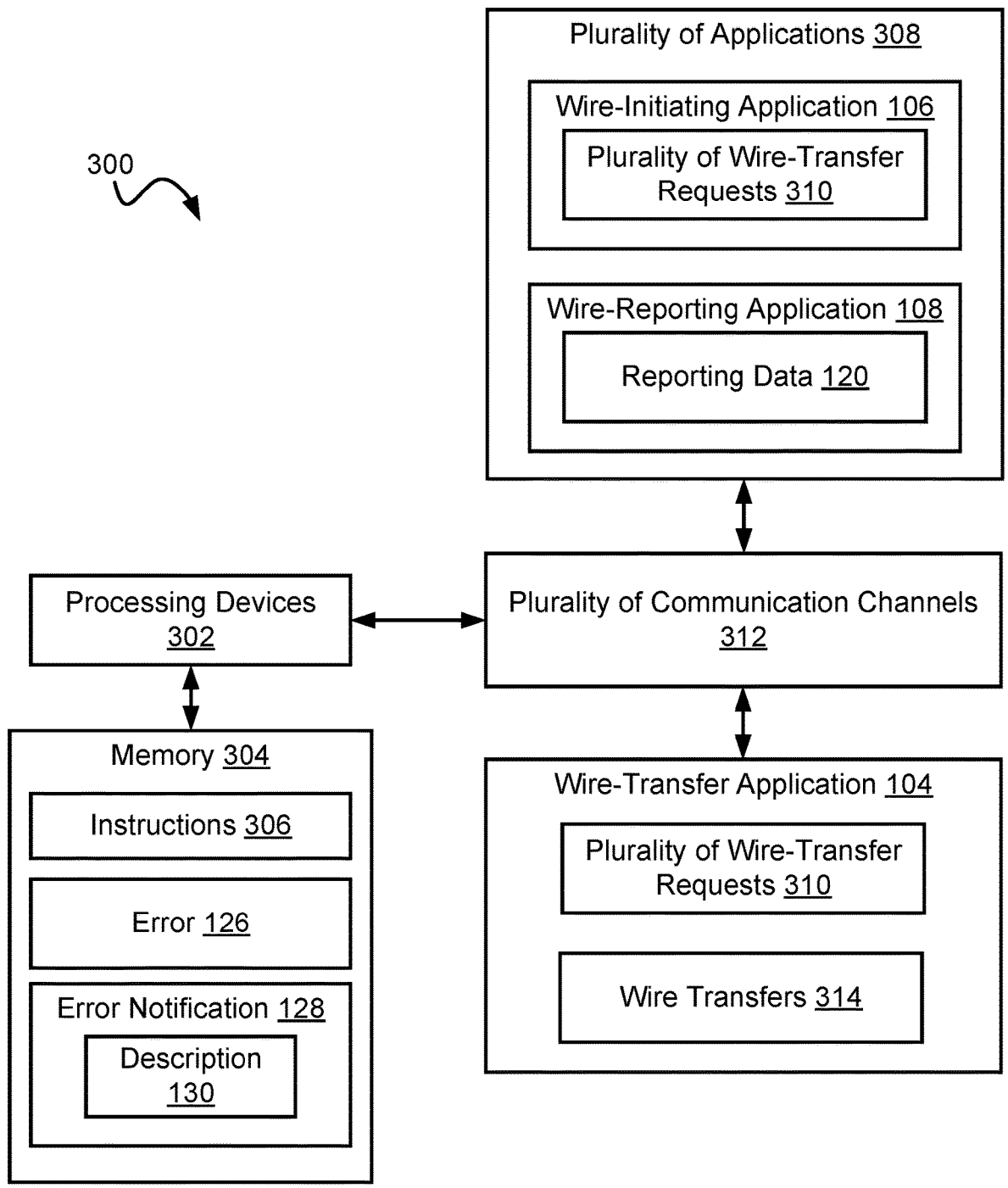
FIG. 3 is a block diagram of an example of a computing system for monitoring wire-transfer requests processed by a wire-transfer application, according to some aspects of the present disclosure.

FIG. 3 is a block diagram of an example of a computing system 300 for monitoring wire-transfer requests processed by a wire-transfer application, according to some aspects of the present disclosure. The computing system 300 depicted in FIG. 3 includes a processing device 302 communicatively coupled to a memory 304.

The processing device 302 can include one processor or multiple processors. Non-limiting examples of the processing device 302 include a Field-Programmable Gate Array (FPGA), an application-specific integrated circuit (ASIC), a microprocessor, etc. The processing device 302 can execute instructions 306 stored in the memory 304 to perform operations. In some examples, the instructions 306 can include processor-specific instructions generated by a compiler or an interpreter from code written in any suitable computer-programming language, such as C, C++, C #, etc.

The memory 304 can include one memory or multiple memories. The memory 304 can be non-volatile and may include any type of memory that retains stored information when powered off. Non-limiting examples of the memory 304 include electrically erasable and programmable read-only memory (EEPROM), flash memory, or any other type of non-volatile memory. At least some of the memory can include a non-transitory computer-readable medium from which the processing device 302 can read instructions 306. A computer-readable medium can include electronic, optical, magnetic, or other storage devices capable of providing the processing device with computer-readable instructions or other program code. Examples of a computer-readable medium include magnetic disk(s), memory chip(s), ROM, RAM, an ASIC, a configured processor, optical storage, or any other non-transitory medium from which a computer processor can read the instructions 306.

In some examples, the processing device 302 can monitor a plurality of communication channels 312 between a plurality of applications 308 and a wire-transfer application 1004 that can perform wire transfers 314. The plurality of applications 308 can include a wire-initiating application 106 that can transfer a plurality of wire-transfer requests 310 to the wire-transfer application 104 and a wire-reporting application 108 that can generate reporting data 120 for the plurality of wire-transfer requests 310. The processing device 302 can detect an error 126 with respect to the plurality of wire-transfer requests 310 or the reporting data 120 transmitted via the plurality of communication channels 312. The processing device 302 can then generate an error notification 128 comprising a description 130 of the error 126 to output for use in resolving the error 126.

Figure 4:
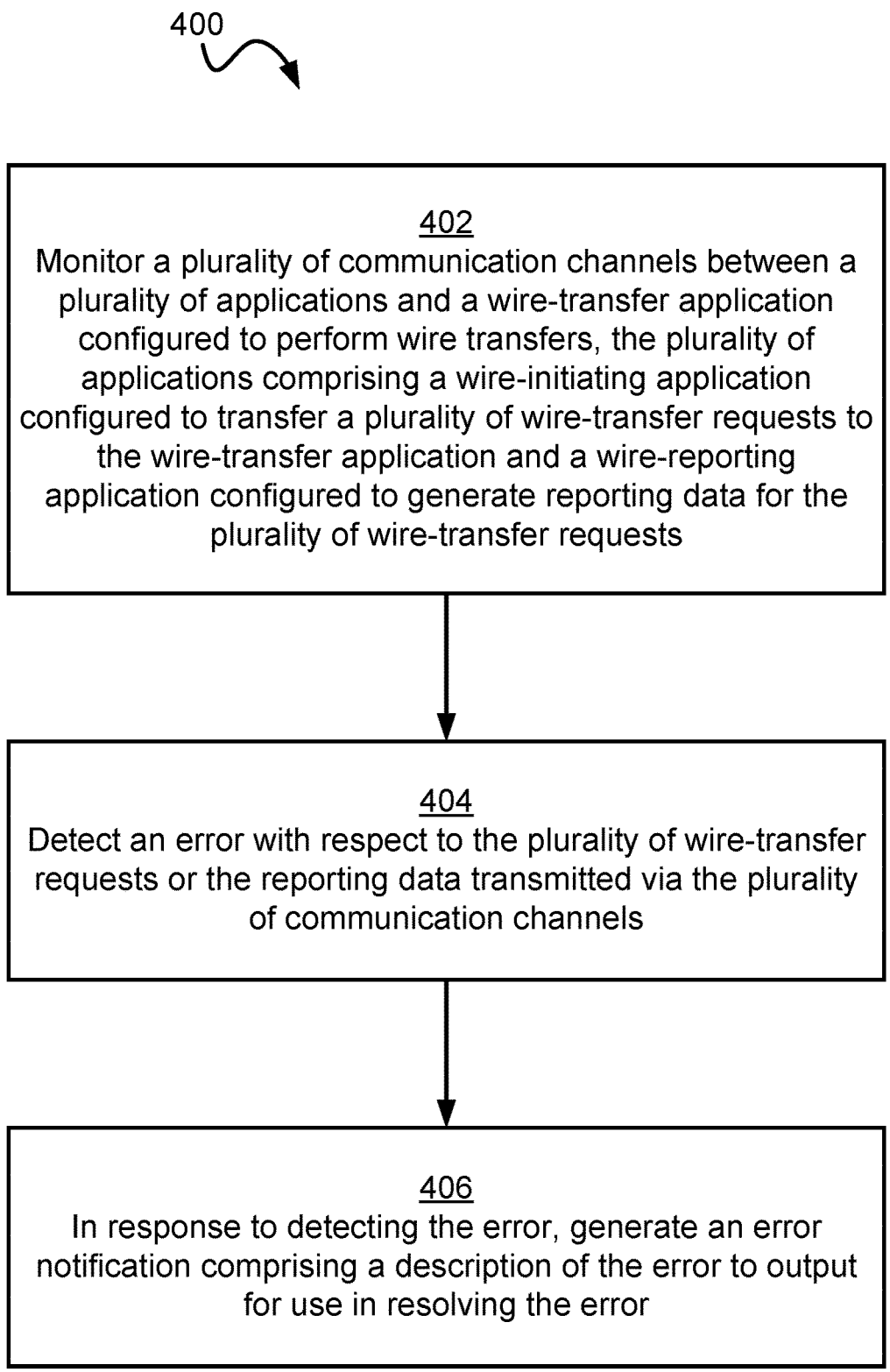
FIG. 4 is a flowchart of a process for monitoring wire-transfer requests processed by a wire-transfer application, according to some examples of the present disclosure.

FIG. 4 is a flowchart of a process 400 for monitoring wire-transfer requests 102 processed by a wire-transfer application 104, according to some examples of the present disclosure. FIG. 4 is described with references to components in FIGS. 1-3. Other examples can include more steps, fewer steps, different steps, or a different order of the steps than is depicted in FIG. 4.

At block 402, the processing device 302 can monitor a plurality of communication channels 312 between a plurality of applications 308 and a wire-transfer application 104 that can perform wire transfers 314. The plurality of applications 308 can include a wire-initiating application 106 that can transfer a plurality of wire-transfer requests 310 to the wire-transfer application 104 and a wire-reporting application 108 that can generate reporting data 120 for the plurality of wire-transfer requests 310. For example, the processing device 302 can determine that a first communication channel 114a is active. That is, the first communication channel 114a may be established between the wire-transfer application 104 and the wire-initiating application 106, and wire-transfer requests 102 may be flowing through the first communication channel 114a. While the first communication channel 114a is active, the processing device 302 can monitor the plurality of wire-transfer requests 310 that are transmitted via the first communication channel 114a. The processing device 302 can also monitor a second communication channel 114b between the wire-transfer application 104 and the wire-reporting application 108, or between the wire-reporting application 108 and a reporting database 122. Reporting data 120 associated with the plurality of wire-transfer requests 310 can be transmitted via the second communication channel 114b. The processing device 302 can also monitor a third communication channel 114c between a first wire-transfer service 116a and a second wire-transfer service 116b in the wire-transfer application 104, such as between a SWIFT service and a Fedwire service. The third communication channel 114c can be used to transmit wire-transfer requests 102 between the wire-transfer services 116a-c.

At block 404, the processing device 302 can detect an error 126 with respect to the plurality of wire-transfer requests 310 or the reporting data 120 transmitted via the plurality of communication channels 312. For example, a particular wire-transfer request 102 can be transmitted from the wire-initiating application 106 via the first communication channel 114a at a transmission time 132. The processing device 302 can detect that the wire-transfer request 102 has not been received by the wire-transfer application 104 within a predetermined amount of time 134 from the transmission time 132. This can indicate that an error 126 has occurred. For example, the wire-transfer request 102 may have been improperly dropped by the first communication channel 114a. Or, the first communication channel 114a or the wire-transfer application 104 may be experiencing an error 126. In some examples, this can indicate that a network latency for the wire-transfer application 104 is too high.

In another example, the SWIFT service can receive a wire-transfer request 102, which can be in a first format 118a. The SWIFT service and the CHIPS service may both be needed to fulfill the wire-transfer request 102. So, the SWIFT service may convert the wire-transfer request 102 from the first format 118a to a second format 118b associated with the CHIPS service. The SWIFT service may transmit the converted wire-transfer request 102 to the CHIPS service via the third communication channel 114c. The processing device 302 can detect an error 126 associated with transmitting the converted wire-transfer request 102 via the third communication channel 114c. For example, the processing device 302 can detect an error 1256 if the converted wire-transfer request 102 is not received by the CHIPS service within the predetermined amount of time 134 from transmission time 132.

In yet another example, the processing device 302 can detect that reporting data transmitted via the second communication channel 114b has an error 126. The reporting data 120 can include a plurality of files that are generated, stored, or processed by the wire-reporting application 108. The processing device 302 can detect files that the wire-reporting application 108 may be unable to process. For example, a particular file 124 may be corrupted or incorrectly formatted.

At block 406, in response to detecting the error 126, the processing device 302 can generate an error notification 128 comprising a description 130 of the error 126 to output for use in resolving the error 126. In some examples, the error notification 128 can be an email notification. The processing device 302 can identify a user 136 associated with the error 126. Examples of the user 136 can include a user that initiated the wire-transfer request 102 associated with the error 126, an employee responsible for the wire-transfer application 104 (or any other component of the computing environment 100), or any other user associated with the error 126. The processing device 302 can then output the email notification to the user 136. In some examples, the processing device 302 can automatically perform an operation to resolve the error 126. For example, if the error 126 involves a wire-transfer request 102 getting dropped by a communication channel 114 between the wire-transfer application 104 and the wire-initiating application 106, or between wire-transfer services 116a-c in the wire-transfer application 104, the processing device 302 can cancel the initial wire-transfer request 102 and resend a new wire-transfer request 102.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
 a processing device; and
 a non-transitory memory comprising instructions that are executable by the processing device for causing the processing device to:
  monitor a plurality of communication channels between a plurality of applications and a wire-transfer application configured to perform wire transfers, the plurality of applications comprising a wire-initiating application configured to transfer a plurality of wire-transfer requests to the wire-transfer application and a wire-reporting application configured to generate reporting data for the plurality of wire-transfer requests, wherein:
   the wire-transfer application comprises a plurality of wire-transfer services, wherein:
    a first wire-transfer service of the plurality of wire-transfer services is configured to convert a wire-transfer request of the plurality of wire-transfer requests received by the wire-initiating application from a first format associated with the first wire-transfer service to a second format associated with a second wire-transfer service of the plurality of wire-transfer services, wherein:
     the second wire-transfer service is configured to process the wire-transfer request in the second format to perform a wire transfer;
     the first wire-transfer service of the plurality of wire-transfer services is a Fedwire service;
     the second wire-transfer service of the plurality of wire-transfer services is a Clearing House Interbank Payments System (CHIPS) service; and a third wire-transfer service of the plurality of wire-transfer services is a Society for Worldwide Interbank Financial Telecommunications (SWIFT) service;

monitor a communication channel between the first wire-transfer service and the second wire-transfer service, the first wire-transfer service configured to transmit the converted wire-transfer request to the second wire-transfer service via the communication channel;

detect an error with respect to the plurality of wire-transfer requests or the reporting data transmitted via the plurality of communication channels, wherein:
the error is with respect to the converted wire-transfer request transmitted via the communication channel to the second wire-transfer service; and
the error involves the wire-transfer application not receiving a subset of the plurality of wire-transfer requests from the wire-initiating application; and
in response to detecting the error:
generate an error notification comprising a description of the error to output for use in resolving the error; and
determine a mitigation operation using a machine learning model to resolve the error, wherein the mitigation operation comprises deactivating a communication channel between the wire-transfer application and the wire-initiating application, wherein deactivating the communication channel between the wire-transfer application and the wire-initiating application is configured to cause the communication channel between the wire-transfer application and the wire-initiating application to be automatically re-established; and
output a command to cause the execution of the mitigation operation.

2. The system of claim 1, wherein the instructions are further executable by the processing device for causing the processing device to detect the error by:
determining that a first communication channel of the plurality of communication channels is active;
in response to determining that the first communication channel is active, monitoring the plurality of wire-transfer requests transmitted from the wire-initiating application to the wire-transfer application via the first communication channel; and
detecting that a particular wire-transfer request of the plurality of wire-transfer requests transmitted by the wire-initiating application at a transmission time has not been received by the wire-transfer application within a predetermined amount of time from the transmission time.

3. The system of claim 1, wherein the wire-reporting application is configured to generate a plurality of files comprising the reporting data associated with the plurality of wire-transfer requests initiated by the wire-initiating application, and wherein the instructions are further executable by the processing device for causing the processing device to detect the error by detecting that a particular file of the plurality of files is corrupted.

4. The system of claim 3, wherein the instructions are further executable by the processing device for causing the processing device to detect the error by determining that the wire-reporting application is unable to process the particular file of the plurality of files.

5. The system of claim 1, wherein the error notification is an email notification, and wherein the instructions are further executable by the processing device for causing the processing device to:
in response to detecting the error, identifying a user associated with the error; and
outputting the email notification to the user.

6. The system of claim 1, comprising additional instructions that are executable by the processing device for causing the processing device to:
in response to the mitigation operation not resolving the error, generate a second error notification comprising the description and a result of the mitigation operation; and
output the second error notification.

7. The system of claim 1, wherein the wire-transfer application is a Money Transfer Service (MTS) and the wire-initiating application is a Wire Payment Initiation (WPI) service.

8. A method comprising:
monitoring, by a processing device, a plurality of communication channels between a plurality of applications and a wire-transfer application configured to perform wire transfers, the plurality of applications comprising a wire-initiating application configured to transfer a plurality of wire-transfer requests to the wire-transfer application and a wire-reporting application configured to generate reporting data for the plurality of wire-transfer requests, wherein:
the wire-transfer application comprises a plurality of wire-transfer services, wherein:
a first wire-transfer service of the plurality of wire-transfer services is configured to convert a wire-transfer request of the plurality of wire-transfer requests received by the wire-initiating application from a first format associated with the first wire-transfer service to a second format associated with a second wire-transfer service of the plurality of wire-transfer services, wherein:
the second wire-transfer service is configured to process the wire-transfer request in the second format to perform a wire transfer;
the first wire-transfer service of the plurality of wire-transfer services is a Fedwire service;
the second wire-transfer service of the plurality of wire-transfer services is a Clearing House Interbank Payments System (CHIPS) service; and
a third wire-transfer service of the plurality of wire-transfer services is a Society for Worldwide Interbank Financial Telecommunications (SWIFT) service;
monitoring a communication channel between the first wire-transfer service and the second wire-transfer service, the first wire-transfer service configured to transmit the converted wire-transfer request to the second wire-transfer service via the communication channel;
detecting an error with respect to the plurality of wire-transfer requests or the reporting data transmitted via the plurality of communication channels, wherein:
the error is with respect to the converted wire-transfer request transmitted via the communication channel to the second wire-transfer service; and
the error involves the wire-transfer application not receiving a subset of the plurality of wire-transfer requests from the wire-initiating application; and in response to detecting the error:
generating an error notification comprising a description of the error to output for use in resolving the error; and
determining a mitigation operation using a machine learning model to resolve the error, wherein the mitigation operation comprises deactivating a communication channel between the wire-transfer application and the wire-initiating application, wherein deactivating the communication channel between the wire-transfer application and the wire-initiating application is configured to cause the communication channel between the wire-transfer application and the wire-initiating application to be automatically re-established; and
outputting a command to cause the execution of the mitigation operation.

9. The method of claim 8, wherein detecting the error further comprises:
determining that a first communication channel of the plurality of communication channels is active;
in response to determining that the first communication channel is active, monitoring the plurality of wire-transfer requests transmitted from the wire-initiating application to the wire-transfer application via the first communication channel; and
detecting that a particular wire-transfer request of the plurality of wire-transfer requests transmitted by the wire-initiating application at a transmission time has not been received by the wire-transfer application within a predetermined amount of time from the transmission time.

10. The method of claim 8, wherein the wire-reporting application is configured to generate a plurality of files comprising the reporting data associated with the plurality of wire-transfer requests initiated by the wire-initiating application, and wherein the method further comprises detecting the error by detecting that a particular file of the plurality of files is corrupted.

11. The method of claim 10, further comprising detecting the error by determining that the wire-reporting application is unable to process the particular file of the plurality of files.

12. The method of claim 8, wherein the error notification is an email notification, and wherein the method further comprises:
in response to detecting the error, identifying a user associated with the error; and
outputting the email notification to the user.

13. The method of claim 8, further comprising:
in response to the mitigation operation not resolving the error, generating a second error notification comprising the description and a result of the mitigation operation; and
outputting the second error notification.

14. The method of claim 8, wherein the wire-transfer application is a Money Transfer Service (MTS) and the wire-initiating application is a Wire Payment Initiation (WPI) service.

15. A non-transitory computer-readable medium comprising program code that is executable by a processing device for causing the processing device to:
monitor a plurality of communication channels between a plurality of applications and a wire-transfer application configured to perform wire transfers, the plurality of applications comprising a wire-initiating application configured to transfer a plurality of wire-transfer requests to the wire-transfer application and a wire-reporting application configured to generate reporting data for the plurality of wire-transfer requests, wherein:
the wire-transfer application comprises a plurality of wire-transfer services, wherein:
a first wire-transfer service of the plurality of wire-transfer services is configured to convert a wire-transfer request of the plurality of wire-transfer requests received by the wire-initiating application from a first format associated with the first wire-transfer service to a second format associated with a second wire-transfer service of the plurality of wire-transfer services, wherein:
the second wire-transfer service is configured to process the wire-transfer request in the second format to perform a wire transfer;
the first wire-transfer service of the plurality of wire-transfer services is a Fedwire service;
the second wire-transfer service of the plurality of wire-transfer services is a Clearing House Interbank Payments System (CHIPS) service; and
a third wire-transfer service of the plurality of wire-transfer services is a Society for Worldwide Interbank Financial Telecommunications (SWIFT) service;
monitor a communication channel between the first wire-transfer service and the second wire-transfer service, the first wire-transfer service configured to transmit the converted wire-transfer request to the second wire-transfer service via the communication channel;
detect an error with respect to the plurality of wire-transfer requests or the reporting data transmitted via the plurality of communication channels, wherein:
the error is with respect to the converted wire-transfer request transmitted via the communication channel to the second wire-transfer service; and
the error involves the wire-transfer application not receiving a subset of the plurality of wire-transfer requests from the wire-initiating application; and
in response to detecting the error:
generate an error notification comprising a description of the error to output for use in resolving the error; and
determine a mitigation operation using a machine learning model to resolve the error, wherein the mitigation operation comprises deactivating a communication channel between the wire-transfer application and the wire-initiating application, wherein deactivating the communication channel between the wire-transfer application and the wire-initiating application is configured to cause the communication channel between the wire-transfer application and the wire-initiating application to be automatically re-established; and
output a command to cause the execution of the mitigation operation.

16. The non-transitory computer-readable medium of claim 15, wherein the program code is further executable by the processing device for causing the processing device to detect the error by:
determining that a first communication channel of the plurality of communication channels is active;
in response to determining that the first communication channel is active, monitoring the plurality of wire-transfer requests transmitted from the wire-initiating application to the wire-transfer application via the first communication channel; and detecting that a particular wire-transfer request of the plurality of wire-transfer requests transmitted by the wire-initiating application at a transmission time has not been received by the wire-transfer application within a predetermined amount of time from the transmission time.

17. The non-transitory computer-readable medium of claim 15, wherein the wire-reporting application is configured to generate a plurality of files comprising the reporting data associated with the plurality of wire-transfer requests initiated by the wire-initiating application, and wherein the program code further executable by the processing device for causing the processing device to detect the error by detecting that a particular file of the plurality of files is corrupted.

18. The non-transitory computer-readable medium of claim 17, wherein the program code is further executable by the processing device for causing the processing device to detect the error by determining that the wire-reporting application is unable to process the particular file of the plurality of files.

19. The non-transitory computer-readable medium of claim 15, wherein the error notification is an email notification, and wherein the program code is further executable by the processing device for causing the processing device to:

in response to detecting the error, identifying a user associated with the error; and outputting the email notification to the user.

20. The non-transitory computer-readable medium of claim 15, comprising additional program code that is executable by the processing device for causing the processing device to:

in response to the mitigation operation not resolving the error, generate a second error notification comprising the description and a result of the mitigation operation; and output the second error notification.

* * * * *